United States Patent
Ohara

(10) Patent No.: US 7,105,219 B2
(45) Date of Patent: Sep. 12, 2006

(54) BRAZING CONSTRUCTION AND METHOD OF BRAZING AN ABRADABLE SEALING MATERIAL

(75) Inventor: Minoru Ohara, Hyogo-ken (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 146 days.

(21) Appl. No.: 10/854,228

(22) Filed: May 27, 2004

(65) Prior Publication Data

US 2005/0266207 A1    Dec. 1, 2005

(51) Int. Cl.
*B32B 3/12* (2006.01)

(52) U.S. Cl. .................... 428/116; 428/117; 428/119; 264/630; 264/340; 156/89.22

(58) Field of Classification Search ........ 428/116–117, 428/119; 264/630, 340; 156/89.22
See application file for complete search history.

(56) References Cited

U.S. PATENT DOCUMENTS 6,152,690 A    11/2000  Tomita et al.

FOREIGN PATENT DOCUMENTS

| GB | 2 001 692 A | 2/1979 |
| GB | 2 019 263 A | 10/1979 |
| JP | 28 32 830 A1 A | 2/1979 |
| JP | 29 01 134 A1 | 10/1979 |
| JP | 11-6446 A | 1/1999 |
| JP | 11-13404 A | 1/1999 |
| JP | 2001-123803 A | 5/2001 |

*Primary Examiner*—Ling Xu
(74) *Attorney, Agent, or Firm*—Birch, Stewart, Kolasch & Birch, LLP.

(57) ABSTRACT

A brazing construction and method of brazing an abradable sealing material onto a base material is provided. The abradable sealing material is a tabular member having a cellular compartment construction in honeycomb form having empty compartments and partitions formed by overlapping a plurality of thin corrugated sheets. The abradable sealing material is brazed on the main material by, applying a stop-off agent on a side surface of the abradable sealing material except on a portion of the side surface close to a brazing face to form a stop-off area that prevents infiltration of a brazing filler metal in an overlapping part; superposing the brazing face of the abradable sealing material on the base material, such that the brazing filler metal is provided between the abradable sealing material and the base metal; and brazing the abradable sealing material to said base material.

11 Claims, 6 Drawing Sheets a b c d e

BRAZING CONSTRUCTION AND METHOD OF BRAZING AN ABRADABLE SEALING MATERIAL

BACKGROUND OF THE INVENTION

1. Field of the Invention

The present invention relates to a brazing construction and a brazing method for an abradable sealing material such as those that may be applied to an internal surface of a casing of a turbine, opposing rotor blades of the turbine.

2. Description of the Related Art

This type of abradable sealing material is generally called honeycomb seal because it appears to have a honeycomb construction when seen from the turbine rotor blade side.

Honeycomb seal is a thin tabular sealing material which is attached to an inner periphery face of a split ring on the casing positioned opposite the rear rotor blade of a gas turbine, and which seals the gap between the turbine rotor blade and the split ring. Also, this honeycomb seal is formed to have excellent abradability (ease of abrasion), so that its own surface will be abraded when the tip of a turbine rotor blade makes contact for some reason (heat expansion etc.), and so it prevents damage to the turbine rotor blade and the split ring caused by contact (see Japanese Unexamined Patent Application, First Publication 11-6446 and Japanese Unexamined Patent Application, First Publication 11-13404).

FIG. 6 shows an enlargement of a schematic configuration of a honeycomb seal, and FIG. 7 shows a sectional view on VI—VI of FIG. 6. In FIG. 6, reference numeral 1 denotes a honeycomb seal fixed by brazing to the upper surface of a base material 10 which is a member at the casing side (split ring or similar). The honeycomb seal 1 is formed as a tabular member that has a cellular compartment construction in honeycomb form comprised of empty compartments and partitions in order to have abradability in the direction A perpendicular to the face of the base material 10 and sealing ability in a specified direction B parallel to the face of the base material 10. Reference numeral 3 denotes numerous cells (cellular compartments) in honeycomb form.

Because this honeycomb seal 1 forms honeycomb-shaped cells 3 by means of the combination of a plurality of thin corrugated sheets 2 standing vertically in the direction A perpendicular to the face of the base material 10, it has micro gaps 5 in the overlapped parts 4 of each thin corrugated sheet 2. Here, the direction B in which the sealing property is created is orthogonal to the direction in which the thin corrugated sheets 2 extend.

When a honeycomb seal 1 of this kind of construction is brazed to the base material 10, the operation proceeds according to the processes shown in FIG. 8. Firstly, as shown in step a in FIG. 8, the honeycomb seal 1 constructed by combining each of the thin corrugated sheets 2, is placed on the base material 10 and temporarily fixed by spot welding.

Next, as shown in step b in FIG. 8, a powdered brazing filler metal 7 is sprinkled over the honeycomb seal 1 into each of the cells 3 (cellular compartments) and the powder of the brazing filler metal 7 spreads evenly on the base material 10. Alternatively, as shown in steps c and d in FIG. 8, a sheet form of brazing filler metal 7 formed using a binding agent is placed on top of the honeycomb seal 1 and dissolved with an acetone 8 so that it falls into each of the cells 3.

Subsequently, as shown in step e in FIG. 8, the assembly is placed in a heating furnace 9 and the honeycomb seal 1 is brazed to the base material 10.

Incidentally, although the requirement of the product is that the honeycomb seal 1 impart excellent abradability to the surface side opposing the turbine rotor blade, there is a concern that a defect may arise when brazing is carried out as described above.

Specifically, because the honeycomb seal 1 is constructed by the combination of a plurality of thin corrugated sheets 2 as mentioned above, it has micro gaps 5 in the overlapped parts 4 of each of the thin corrugated sheets 2. These micro gaps 5 extend in the direction A perpendicular to the face of the base material 10, and when the honeycomb seal 1 is brazed to the base material 10, then as shown in FIG. 7, the brazing filler metal 7 infiltrates into the micro gaps 5 by capillary action and the rigidity of the honeycomb seal 1 increases, and as a result there is a concern that the abradability of the same area may decrease. If the abradability decreases in this way, it will no longer be able to function as a honeycomb seal as the wear on the turbine rotor blade side becomes severe.

SUMMARY OF THE INVENTION

The present invention takes into consideration the above-mentioned situation with an object of providing a brazing construction and a method for brazing for an abradable sealing material wherein a decrease in abradability does not occur.

In order to address the above problems, the present invention employs the following means.

That is to say, a first aspect of the invention is a brazing construction for an abradable sealing material in which the abradable sealing material is brazed to a base material, the abradable sealing material being a tabular member having a cellular compartment construction in honeycomb form consisting of empty compartments and partitions formed by overlapping a plurality of thin corrugated sheets, and the abradable sealing material fixed with respect to the base material to seal a gap between the base material and a rotating body, and to be abraded itself when contacted by the rotating body, wherein a stop-off area that prevents infiltration of a brazing filler metal is provided on a non-brazed side of the abradable sealing material with a predetermined depth.

According to the brazing construction for an abradable sealing material of the above first aspect, the stop-off area that prevents the brazing filler metal from infiltrating is provided on the non-brazed side of the abradable sealing material with a predetermined depth. Therefore the brazing filler metal can be prevented from infiltrating to this area.

A second aspect of the present invention is a method of brazing for an abradable sealing material in which the abradable sealing material is brazed to a base material, the abradable sealing material being a tabular member having a cellular compartment construction in honeycomb form consisting of empty compartments and partitions formed by overlapping a plurality of thin corrugated sheets, and the abradable sealing material being fixed with respect to the base material to seal a gap between the base material and a rotating body, and to be abraded itself when contacted by the rotating body, wherein a stop-off area that prevents infiltration of a brazing filler metal is secured on a non-brazed side constituting one side of the abradable sealing material with a predetermined depth; and then an other side of the abradable sealing material is brazed to the base material.

According to the method of brazing for an abradable sealing material of the above second aspect, the stop-off area that prevents the brazing filler metal from infiltrating is provided on the non-brazed side of the abradable sealing material with a predetermined depth. Therefore the brazing filler metal can be prevented from infiltrating to this area.

A third aspect of the invention is a method of brazing for an abradable sealing material according to the second aspect, comprising in sequence the steps of: masking an area outside the stop-off area by pressing a brazing side of the abradable sealing material into a masking sheet; forming a film of stop-off agent on the stop-off area, by applying a stop-off agent to the abradable sealing material; removing the masking sheet from the abradable sealing material; superposing a brazing side of the abradable sealing material onto the base material and distributing brazing filler metal therebetween; and brazing by heating the abradable sealing material and the base material.

According to the method of brazing for an abradable sealing material of the above third aspect, once the masking area has been secured by pushing the abradable sealing material into the masking sheet, a film of the stop-off agent is formed on the surface of the abradable sealing material. Therefore the stop-off area can be secured accurately and with certainty. Consequently, infiltration of the brazing filler metal into the stop-off area can be prevented with certainty when brazing is carried out.

A fourth aspect of the present invention is a method of brazing for an abradable sealing material according to the third aspect, wherein a brazing filler metal sheet (for example, Nicrobraz LM transfer tape (Bni-2) made by Wall Colmonoy Co. of the U.S.A. or similar is appropriate) is employed as the brazing filler metal, and in the step of distributing the brazing filler metal, the brazing filler metal sheet is placed between the base material and the abradable sealing material.

According to the method of brazing for an abradable sealing material of the fourth aspect, the brazing filler metal can be distributed evenly on the base material, and irregularities in the brazing can be reduced. Also, there is the merit that the incidence of faults (shortage of brazing filler metal) is reduced.

DETAILED DESCRIPTION OF THE INVENTION

Hereafter, embodiments of the present invention are described, with reference to the drawings.

Figure 3:
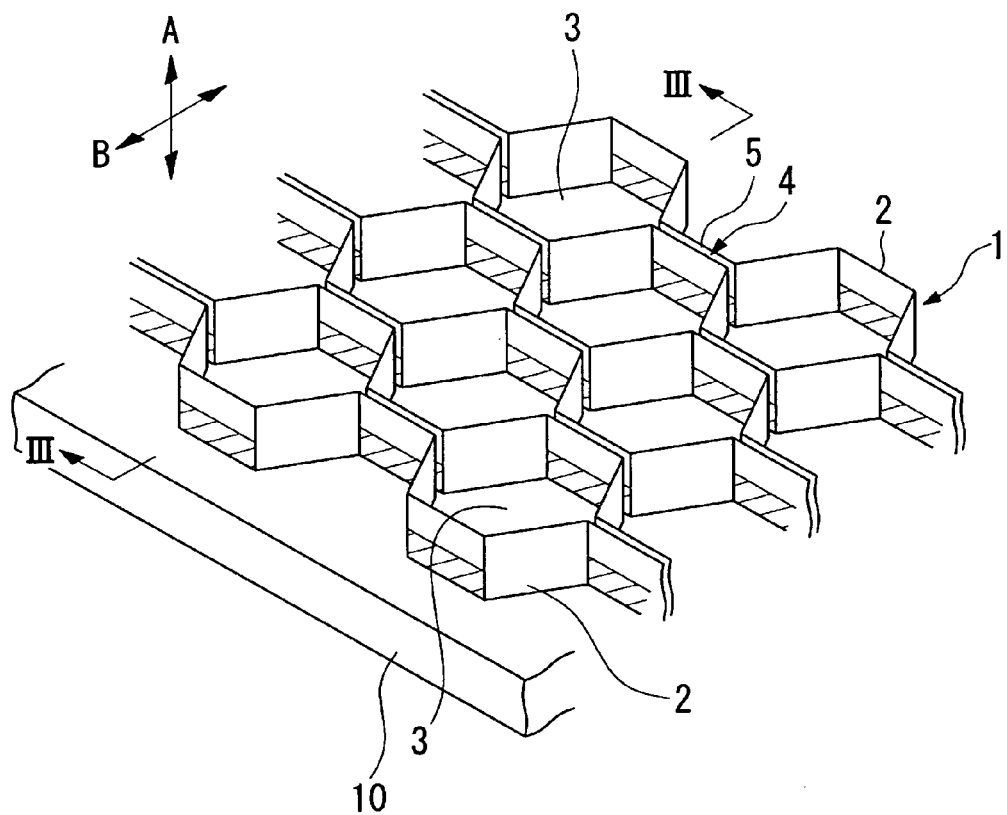
FIG. 3 is a schematic perspective view of a brazing construction of a honeycomb seal obtained as a result of carrying out the processes according to the process flow in FIG. 1.

As shown in FIG. 3, a honeycomb seal 1 is fixed by brazing to the upper surface (inner periphery side) of a base material (split ring etc.) 10 at the casing side opposing a turbine rotor blade being a rotating body (not shown in the drawing). The honeycomb seal 1 is formed as a tabular member with a cellular honeycomb compartment construction consisting of empty compartments and partitions in order to have abradability in a direction A perpendicular to the face of the base material 10 and the property of sealing in a direction B parallel to the same face of the base material 10. Reference numeral 3 in FIG. 3 denotes the numerous cells (cellular compartments) in the honeycomb form.

Because this honeycomb seal 1 forms honeycomb type cells 3 by means of a combination of a plurality of thin corrugated sheets 2 standing vertically in the direction A perpendicular to the face of the base material 10, it has micro gaps 5 in the overlapped parts 4 of each thin corrugated sheet 2. Here, the direction B in which the sealing property is created is orthogonal to the direction in which the thin corrugated sheets 2 extend.

Figure 1:
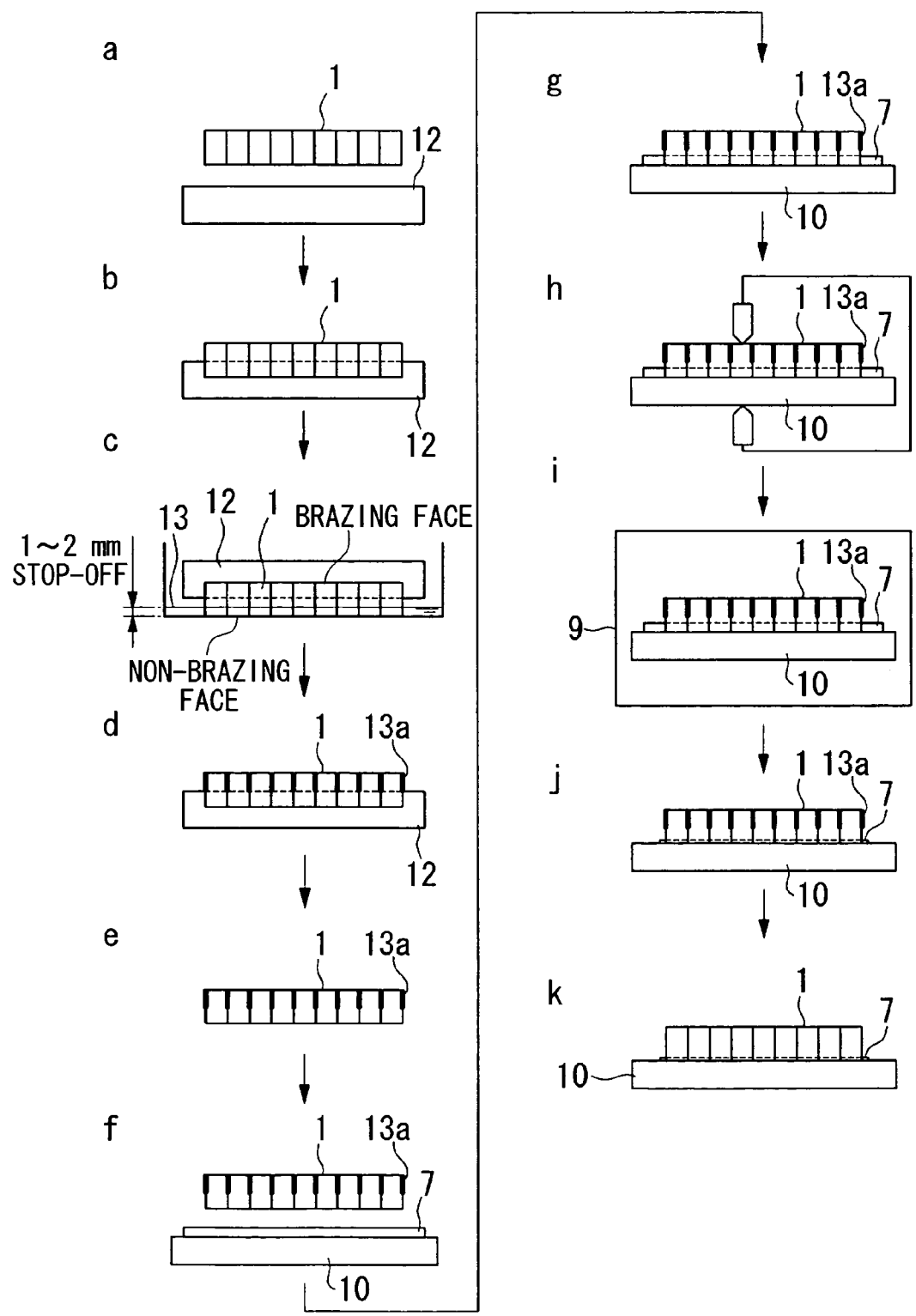
FIG. 1 is a process explanatory diagram showing one embodiment of a brazing method for an abradable sealing material of the present invention.

When this honeycomb seal 1 is brazed to the base material 10, the operation proceeds according to the process flow shown in FIG. 1.

Firstly, as shown in steps a and b in FIG. 1, an area to a predetermined depth on the brazing side is masked by pressing the brazing side of the honeycomb seal 1 into a soft silicone resin masking sheet 12 whose thickness is a about half of the thickness of the honeycomb seal 1. By inserting the honeycomb seal 1 into the masking sheet 12 in this manner, the resin gets into the micro gaps 5 of the honeycomb seal 1 and the resin covers the contact surface of the honeycomb seal 1. The masking sheet 12 in this case must be able to penetrate into a gap of micron units, and have excellent mold-releasing properties. For example, RepliSet of Marumoto Struers K.K. or similar, is suitable.

Next, as shown in step c in FIG. 1, by immersing the honeycomb seal 1, inserted as it is into the masking sheet 12, in a tank of a stop-off agent 13, and depositing the stop-off agent 13 on the honeycomb seal 1, then as shown in step d in FIG. 1, a film 13a of the stop-off agent is formed on the area apart from the masked area. For the immersion time, a short time of for example five to ten seconds is sufficient. The stop-off agent 13 reduces wettability to the brazing filler metal, and works to prevent infiltration of the brazing filler metal. In consideration of ease of removal after the operation, for example Nicrobraz White Stop-Off Type 2 (soluble, can be almost completely removed by air blowing and water washing) or similar can be suitably employed. Also, the viscosity of the stop-off agent 13 should be the same as when new. However, when one is used in which the viscosity has increased with the passage of time, it is preferred that the stop-off agent 13 be thinned with alcohol or acetone to the same viscosity as when new before using. Furthermore, the fluid level of the stop-off agent 13 when immersion is carried out should be made to be approximately 1 mm higher than the bottom of the honeycomb seal 1.

The honeycomb seal 1 immersed in the stop-off agent 13 in this way is taken out from the stop-off agent 13, and a microscope is used to examine from above to check whether or not the stop-off agent 13 has infiltrated into the micro gaps 5 in the overlapped parts 4. Because it is desirable that the stop-off agent 13 does not penetrate into each cell 3, the honeycomb seal 1 is placed on an absorbent sheet such as Kimwipe (not shown in the drawing) with its brazing side up, and only the stop-off agent 13 that has penetrated into each of the cells 3 is removed. After that, it is left to dry naturally for about half a day.

Next, as shown in step e in FIG. 1, the masking sheet 12 is removed from the honeycomb seal 1, and then as shown in steps f and g in FIG. 1, the brazing side of the honeycomb seal 1 is placed on the base material 10. At this time, a sheet of brazing filler metal 7 is placed beforehand on the upper surface of the base material 10, and the honeycomb seal 1 is placed on it so as to be pressed in. By so doing, the brazing filler metal 7 can be evenly distributed between the brazing side of the honeycomb seal 1 and the upper surface of the base material 10.

Here, the process from steps a to d in FIG. 1 has been described with an example of the case where masking is carried out. However it is possible to attach the brazing filler metal 7 to the honeycomb seal 1 without carrying out masking, by carrying out the processes from step a to step d in FIG. 2 instead.

Figure 2:
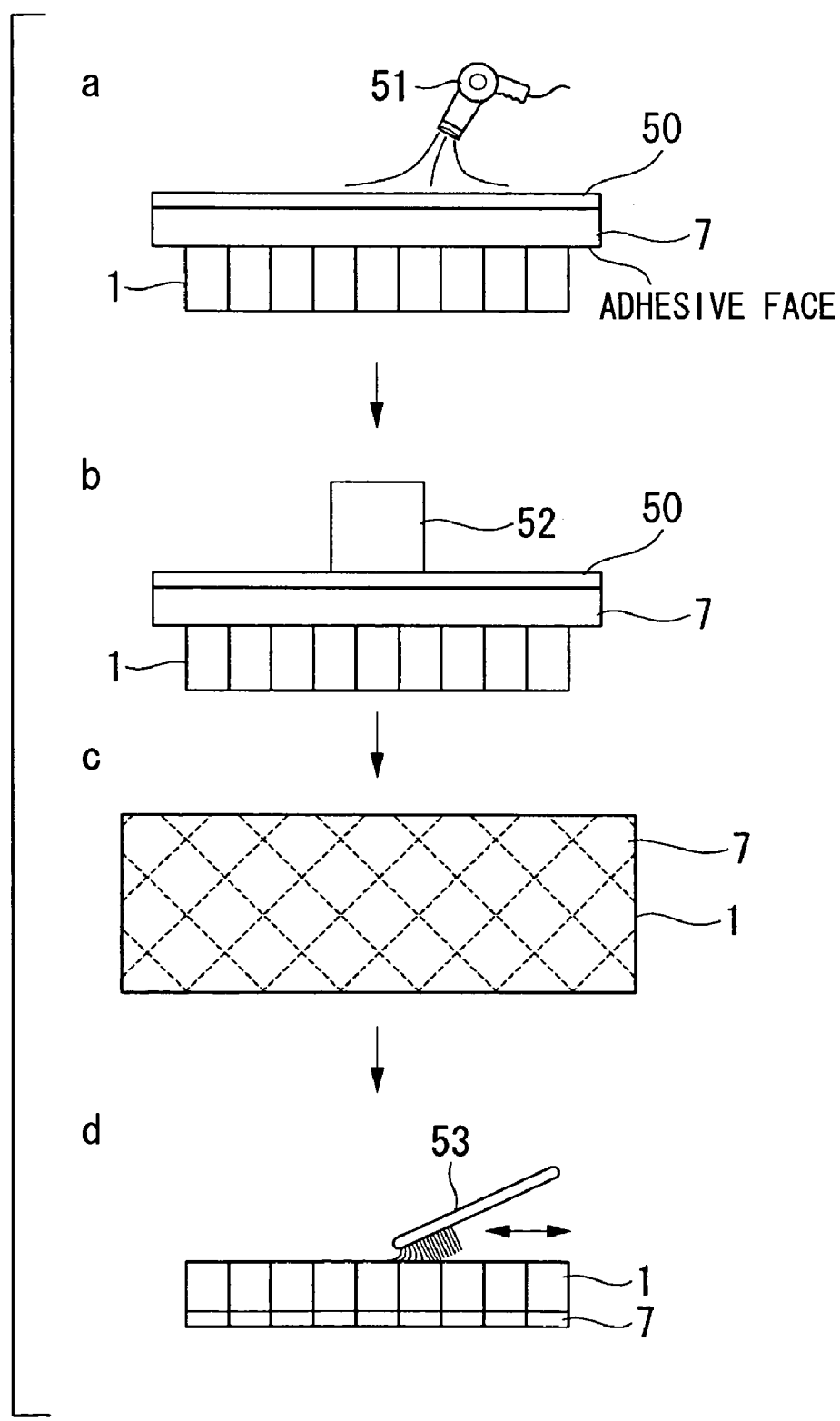
FIG. 2 is a process explanatory diagram showing a partially modified example of the embodiment.

That is to say, as shown in step a in FIG. 2, the honeycomb seal 1 is laid with its brazing side up, and a brazing filler metal 7, and then a vinyl sheet 50 are overlaid on it. Subsequently a dryer 51 or similar is used to apply hot air from above the vinyl sheet 50 and heat it. As a result, the brazing filler metal 7 becomes softer and it can be more easily pressed into the honeycomb seal 1. Thereafter, as shown in step b in FIG. 2, the brazing filler metal 7 is pressed down from above the vinyl sheet 50 using a soft item 52 such as a wood block. At this time it is to be pressed down until the honeycomb pattern of the honeycomb seal 1 appears faintly on the surface of the brazing filler metal 7 as shown in step c in FIG. 2.

Subsequently, so that the parent material of the honeycomb seal 1 will adhere firmly to the base material 10, the excess brazing filler metal 7 is shaved off using a cutting tool such as a cutter knife, and the honeycomb parent material is exposed.

Then, as shown in step d in FIG. 2, the surface side of the honeycomb seal 1 (opposite side of the brazing side) is scrubbed using a wire brush 53 or similar to remove the adhering stop-off agent 13. As a result, it is possible to prevent an obstruction to conduction when carrying out spot welding.

Returning again to step h in FIG. 1 to continue the description, the honeycomb seal 1 is temporarily fixed to the base material 10 by means of spot welding, and the brazing is carried out by placing it into a heating furnace 9 as shown in step i in FIG. 1. Then, once the honeycomb seal 1 is taken out from the heating furnace as shown in step j in FIG. 1, the film 13a of stop-off agent is removed by applying water or air-blowing, and as shown in step k in FIG. 1, a brazing construction of the honeycomb seal 1 is obtained as a product.

Figure 4:
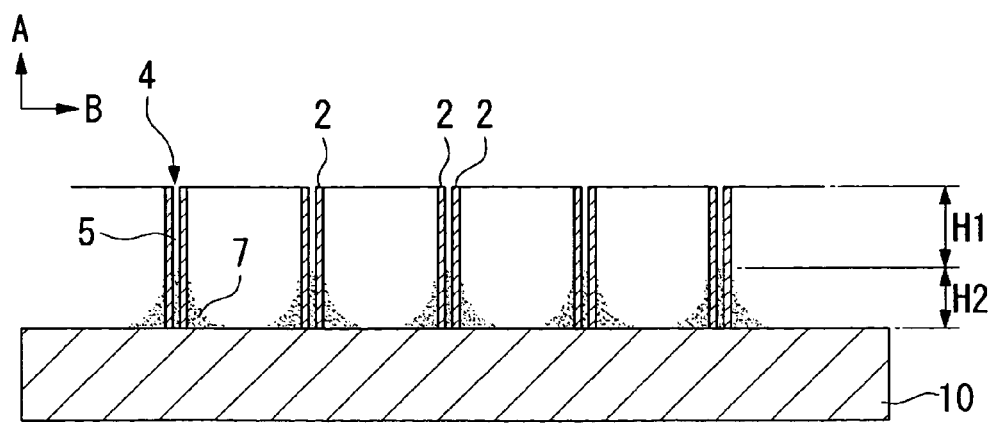
FIG. 4 is a sectional view on III—III of FIG. 3.

By carrying out processes such as each of these, as shown in FIG. 3 and FIG. 4, a stop-off area H1 that prevents the brazing filler metal 7 from infiltrating to a predetermined depth in the non-brazing side of the honeycomb seal 1 can be secured. In other words, despite of having the micro gaps 5, the brazing filler metal 7 can be made to come up no more than a certain height into the micro gaps 5. Furthermore, the portion with hatching drawn in FIG. 3 denotes the height of an area H2 to which the brazing filler metal 7 shown in FIG. 4 has penetrated.

In this way, excellent abradability can be maintained even when brazed, because an area to a predetermined depth on the side that is supposed to be abraded is secured as a stop-off area H1.

Also, when the distribution of the brazing filler metal 7 on the base material 10 is carried out using a sheet form brazing filler metal 7 as described above, because the brazing filler metal 7 can be evenly distributed on the upper surface of the base material 10, irregularities in the brazing can be reduced and the incidence of faults (shortage of brazing filler metal) is reduced.

Figure 5:
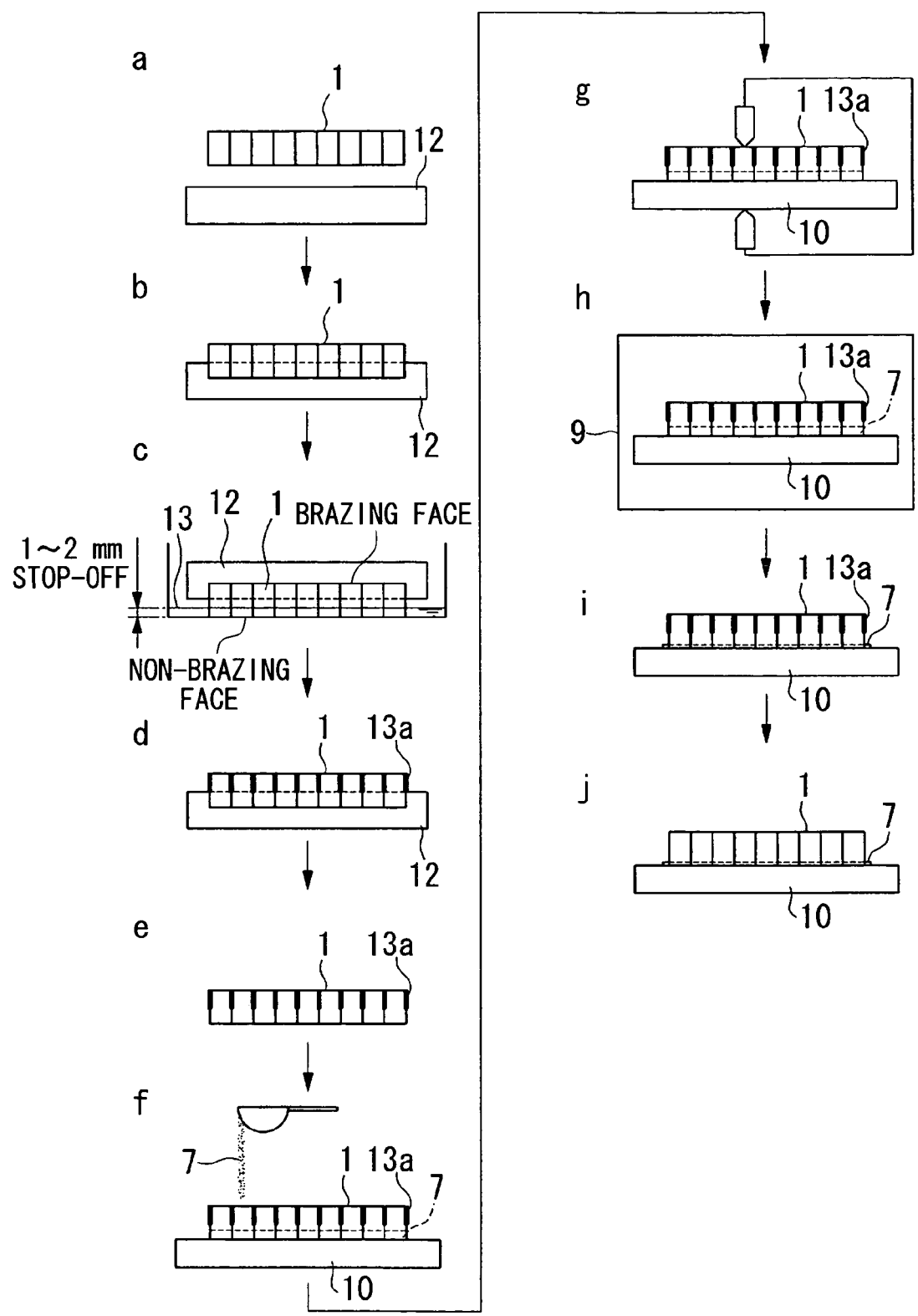
FIG. 5 is a process explanatory diagram showing another embodiment of a brazing method for an abradable sealing material of the present invention.
Figure 6:
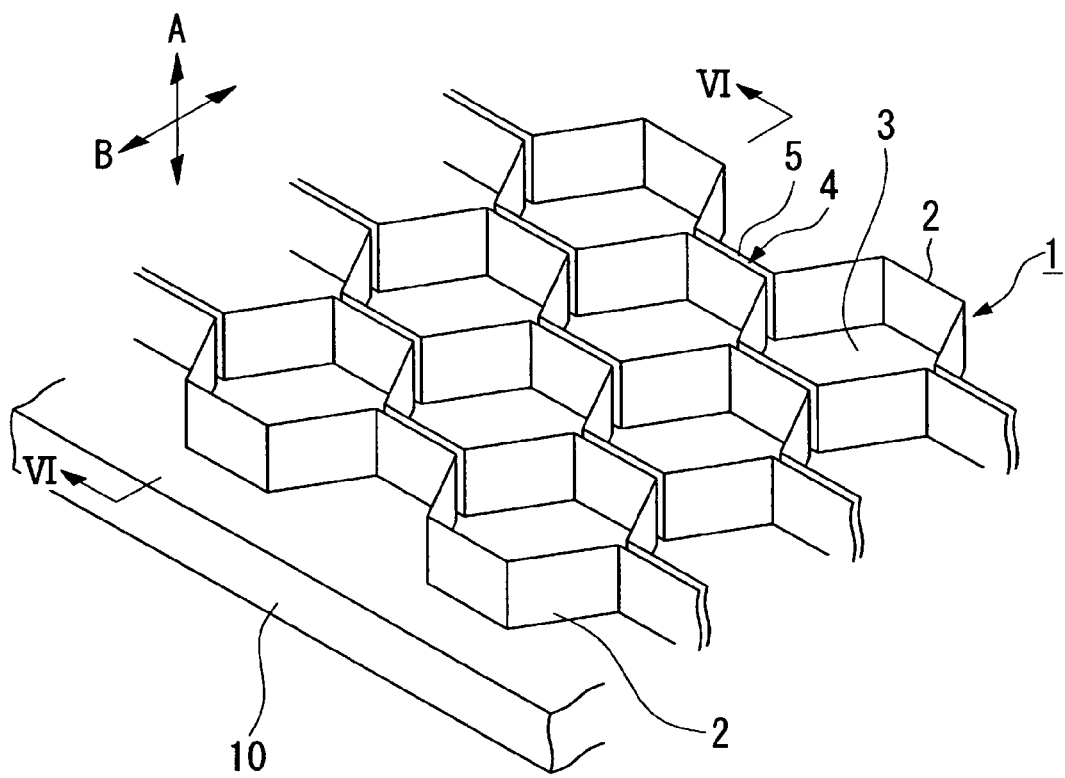
FIG. 6 is a schematic perspective view of a conventional brazing construction for an abradable sealing material.
Figure 7:
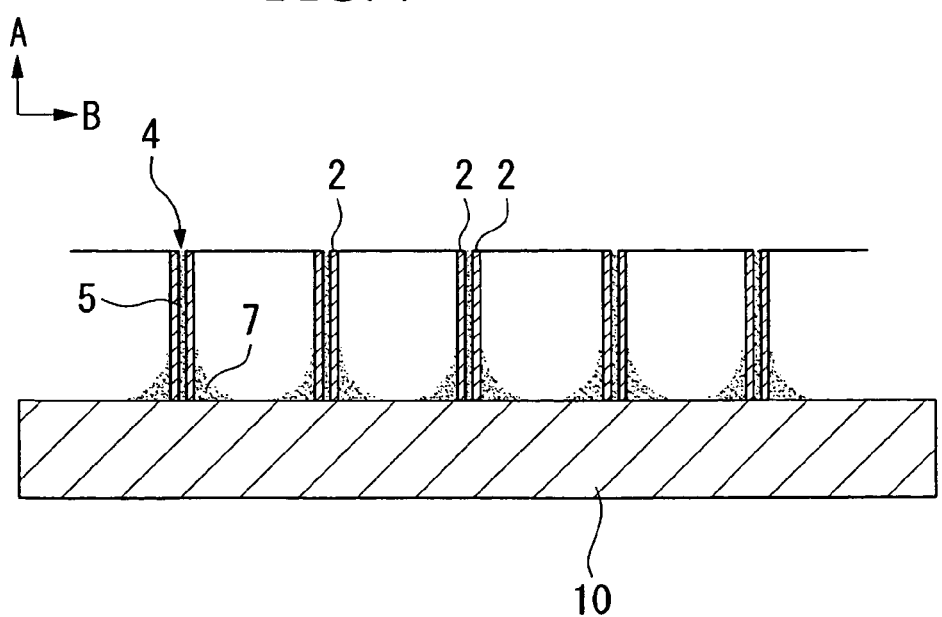
FIG. 7 is a sectional view on VI—VI of FIG. 6.
Figure 8:
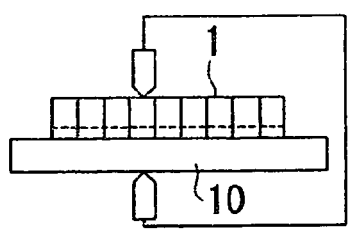
FIG. 8 is a process explanatory diagram of a conventional brazing method for an abradable sealing material.
Figure 8:
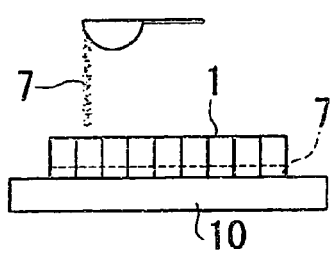
Figure 8:
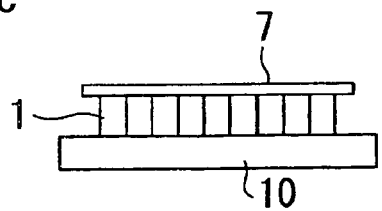
Figure 8:
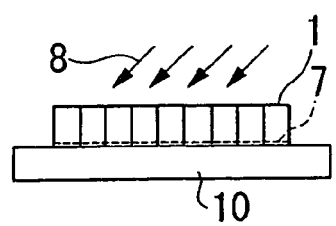
Figure 8:
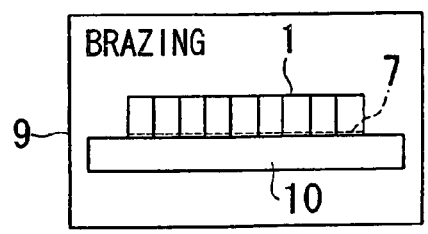

As shown in another embodiment in FIG. 5, the distribution of the brazing filler metal 7 on the base material 10 can also be carried out by sprinkling a powdered brazing filler metal 7 as in step f in FIG. 5. The other processes in this embodiment are exactly the same as the other processes shown in FIG. 1 and FIG. 2, and hence the description is omitted.

What is claimed is:

1. A brazing construction, comprising:
    an abradable sealing material adapted to be brazed on a base material, the abradable sealing material being a tabular member having a cellular compartment construction in honeycomb form including empty compartments and partitions formed by overlapping a plurality of thin corrugated sheets; and
    a stop-off agent provided on a side surface of the abradable sealing material except on a portion of the side surface close to a brazing face to form a stop-off area that prevents infiltration of a brazing filler metal in an overlapping part.

2. The brazing construction, according to claim 1, wherein the stop-off agent is applied on a side surface of the abradable sealing material except on a portion of the side surface close to a brazing face.

3. The brazing construction, according to claim 2, further comprising:
    a brazing filler material placed between the brazing face of the abradable sealing material and the base material prior to brazing.

4. The brazing construction, according to claim 1, wherein a height of the stop-off area is about 1–2 mm.

5. A method of brazing an abradable sealing material onto a base material, the abradable sealing material being a tabular member having a cellular compartment construction in honeycomb form having empty compartments and partitions formed by overlapping a plurality of thin corrugated sheets, the method comprising:
    applying a stop-off agent on a side surface of the abradable sealing material except on a portion of the side surface close to a brazing face to form a stop-off area that prevents infiltration of a brazing filler metal in an overlapping part;
    superposing the brazing face of the abradable sealing material on the base material, such that the brazing filler metal is provided between the abradable sealing material and the base metal; and
    brazing the abradable sealing material to said base material.

6. A method of brazing for an abradable sealing material according to claim 5, wherein the applying step includes:
    masking an area outside said stop-off area by attaching a masking sheet on the side surface of the abradable sealing material except on the portion of the side surface close to the brazing face, forming a film of the stop-off agent on said stop-off area, by applying the stop-off agent to said abradable sealing material, and removing said masking sheet from said abradable sealing material, and wherein the superposing step includes, superposing the brazing face of said abradable sealing material onto said base material and distributing the brazing filler metal therebetween.

7. A method of brazing for an abradable sealing material according to claim 6, wherein the superposing step includes, placing a brazing filler metal sheet between said base material and said abradable sealing material.

8. A method of brazing for an abradable sealing material according to claim 6, wherein the superposing step includes, sprinkling a powdered brazing filler metal on the base material.

9. A method of brazing for an abradable sealing material according to claim 5, wherein the predetermined depth is about 1–2 mm.

10. A method of brazing for an abradable sealing material according to claim 5, wherein the applying step includes, immersing the abradable sealing material in a tank containing the stop-off agent.

11. A method of brazing for an abradable sealing material according to claim 5, wherein the stop-off agent is made of soluble substance.

* * * * *